M. W. STEPHENSON.
Combined Seed Planter and Fertilizer Distributor.
No. 122,675.
Patented Jan. 9, 1872.
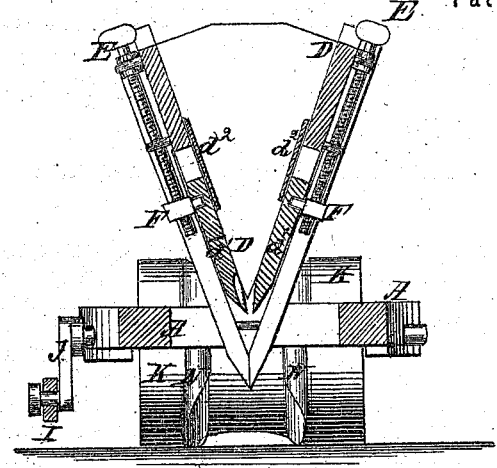
Fig. 2.
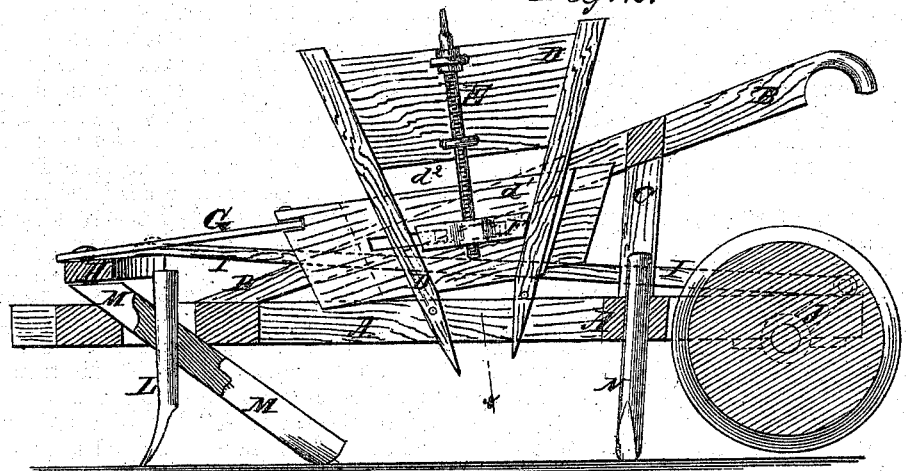
Fig. 3.
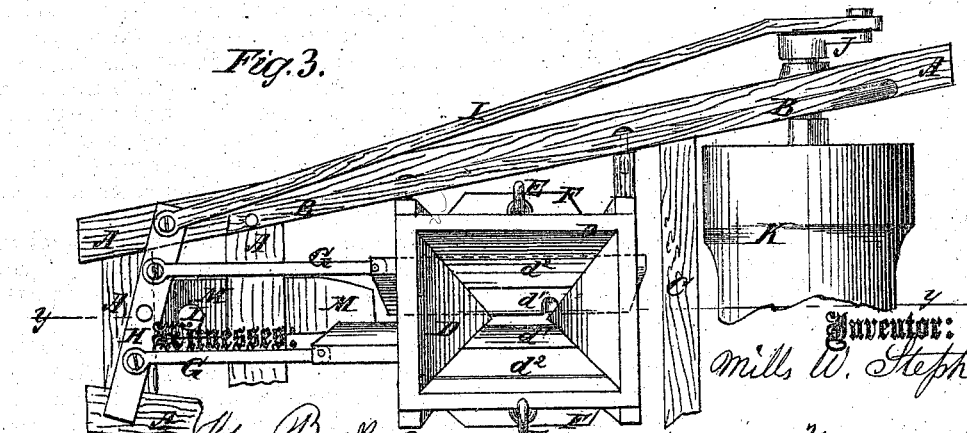
Witnesses:
John Becker.
Francis McArdle.
Inventor:
Mills W. Stephenson
per
Attorneys.

122,675

UNITED STATES PATENT OFFICE.

MILLS W. STEPHENSON, OF PICKENSVILLE, ALABAMA.

IMPROVEMENT IN WALKING-PLANTERS.

Specification forming part of Letters Patent No. 122,675, dated January 9, 1872.

*To all whom it may concern:*

Be it known that I, MILLS W. STEPHENSON, of Pickensville, in the county of Pickens and State of Alabama, have invented a new and useful Improvement in Combined Seed-Planter and Fertilizer-Distributer; and I do hereby declare that the following is a full, clear, and exact description thereof, which will enable others skilled in the art to make and use the same, reference being had to the accompanying drawing forming part of this specification, in which—

Figure 1 is a detail vertical cross-section of my improved machine taken through the line $x\ x$, Fig. 2. Fig. 2 is a side view of the same, partly in section, through the line $y\ y$, Fig. 3. Fig. 3 is a top view of the same, parts being broken away.

Similar letters of reference indicate corresponding parts.

My invention has for its object to furnish a simple, convenient, effective, and reliable machine for planting corn, cotton, peas, and other seeds, and for distributing guano and other fine fertilizers; and it consists in the construction and combination of various parts of the machine, as hereinafter more fully described.

A is the frame of the machine, the side bars of which are inclined so as to make the said frame wider at its rear than at its forward end. B are the handles, the forward ends of which are attached to the forward part of the frame A, the rear parts of which are supported and held in their proper relative positions by the vertical frame C attached to the rear part of the frame A. D is the hopper, the sides and ends of which are inclined as shown in Figs. 1, 2, 3. The lower parts $d^1$ of the sides of the hopper D are movable, and are raised and lowered to regulate the size of the discharge-opening in the bottom of said hopper by screws E, which are swiveled to the stationary upper parts of the sides of the said hopper, and which screw into long nuts F, which have a projection upon their inner sides which enters a long groove in the outer sides of the said movable parts $d^1$ of the sides of the said hopper, so that as the nuts F are raised and lowered by turning the screws E the said movable parts $d^1$ may be raised and lowered with them. The joint between the lower edge of the stationary parts and the upper edge of the movable parts of the sides of the hopper is covered by a plate, $d^2$, which is attached to the said stationary part and overlaps the said movable part, as shown in Figs. 1 and 3. To the forward ends of the movable parts $d^1$ of the sides of the hopper are pivoted the rear ends of the connecting-rods G, the forward ends of which are pivoted to the cross-bar H upon the opposite sides of and equally distant from the pivoting point of said cross-bar. The cross-bar H is pivoted to the forward part of the frame-work of the machine, and to one of its ends is pivoted the forward end of the connecting-rod I, the rear end of which is pivoted to the arm of the crank J attached to the projecting end of one of the journals of the covering-roller K, which is placed between the rear ends of the side bars of the frame A, and the journals of which revolve in bearings attached to the said side bars. The face of the roller K is concaved to give the desired form to the top of the row or ridge. L is the opener, the shank of which passes through the inclined bar M, the forward and upper end of which is attached to the forward part of the frame A. The rear and lower end of the bar M is made V-shaped upon its lower side, and follows in the rear of the opener L to force back the sides of the furrow opened by the said opener to keep the said sides from falling in before the seed is dropped. N are two coverers, which are attached to the frame A in the rear of the hopper D and in front of the covering-roller K in such positions as to force the sides of the furrow inward to cover the seed, the roller K following to press down the soil upon the seed and smooth off the top of the row or ridge.

In this machine the reciprocating movement of the lower parts $d^1$ of the sides of the hopper causes the seeds or fertilizer to pass out regularly and uniformly.

When desired the seed, such as corn, peas, &c., may be dropped in hills by lowering the movable boards $d^1$ until the discharge-opening is closed. The hole in lower inside edge of movable board while inside the hopper gathers the seed, and on passing out deposits the same. The rollers K from which this motion is obtained being one foot in diameter the seed is dropped every three feet. By sinking a hole on the opposite movable board the seed will be deposited half this distance or every eighteen inches, and by sinking holes in the opposite ends of the boards the seed will be dropped every nine inches. The size of these holes will govern the quantity dropped. These holes are easily closed by inserting cork stoppers. But this is necessary only when it is desired to increase the distance in the dropping, the holes not being in the way when planting in drills.

Having thus described my invention, I claim as new, and desire to secure by Letters Patent—

The movable side parts $d^1$ $d^1$ of the hopper D, provided with grooves or slots, the nuts F F, screws E E, connecting-rods G G, pivoted cross-bar H, rod I, and roller K, provided with crank J, arranged to operate in the manner specified.

MILLS W. STEPHENSON.

Wms. Christopher,
G. P. Harvey. (133)